United States Patent
Melam et al.

(10) Patent No.: US 9,246,876 B1
(45) Date of Patent: Jan. 26, 2016

(54) ANTI-REPLAY MECHANISM FOR GROUP VIRTUAL PRIVATE NETWORKS

(75) Inventors: Nagavenkata Suresh Melam, Santa Clara, CA (US); Mukesh Gupta, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 527 days.

(21) Appl. No.: 13/298,951

(22) Filed: Nov. 17, 2011

Related U.S. Application Data (60) Provisional application No. 61/546,674, filed on Oct. 13, 2011.

(51) Int. Cl.
*H04L 29/06* (2006.01)

(52) U.S. Cl.
CPC ............ *H04L 63/0272* (2013.01); *H04L 63/20* (2013.01)

(58) Field of Classification Search
CPC ............ H04L 63/0272; H04L 63/1441; H04L 63/0428; H04L 63/0485; H04L 63/164; H04L 63/16
USPC .......................................................... 726/15
See application file for complete search history.

(56) References Cited

U.S. PATENT DOCUMENTS

| | | | |
|---|---|---|---|
| 6,978,384 B1 * | 12/2005 | Milliken ........................... | 726/26 |
| 7,107,464 B2 * | 9/2006 | Shapira et al. ................... | 726/15 |
| 8,687,485 B1 * | 4/2014 | Dondeti et al. ................ | 370/230 |
| 8,730,826 B2 * | 5/2014 | Regev ............................ | 370/252 |
| 2010/0278045 A1 * | 11/2010 | Xiang ............................ | 370/235 |
| 2011/0153862 A1 * | 6/2011 | Roosta et al. ................. | 709/234 |

OTHER PUBLICATIONS

"Application Note—Introduction to Group VPN", Juniper Networks, Inc. 2011, last modified Feb. 16, 2011, 22 pgs.
Kent et al. "Security Architecture for the Internet Protocol", Network Working Group, Standards Track, RFC 2401, The Internet Society, Nov. 1998, 67 pgs.
Kent et al. "IP Encapsulating Security Payload (ESP)", Network Working Group, Standards Track, RFC 2406, The Internet Society, Nov. 1998, 23 pgs.

* cited by examiner

*Primary Examiner* — Ali Abyaneh
*Assistant Examiner* — Narciso Victoria
(74) *Attorney, Agent, or Firm* — Shumaker & Sieffert, P.A.

(57) ABSTRACT

A virtual private network (VPN) device is described that provides a strict anti-replay mechanism for packets in a group VPN. An example first VPN device includes one or more processors, one or more network interfaces configured to receive a packet having an encryption header that includes a group VPN member identifier association with a second VPN device and a sequence number, wherein the first and second VPN devices are members of a group VPN, a data repository configured to store a window of sequence numbers maintained by the first VPN device for the second VPN device, and a VPN session management module operable by the one or more processors to identify the window of sequence numbers based on the group VPN member identifier, determine whether the sequence number of the header is included in the window of sequence numbers, and process the packet based on the determination.

17 Claims, 5 Drawing Sheets

ANTI-REPLAY MECHANISM FOR GROUP VIRTUAL PRIVATE NETWORKS

This application claims the benefit of U.S. Provisional Patent Application 61/546,674 filed Oct. 13, 2011, the entire content of which is incorporated herein by reference.

TECHNICAL FIELD

This disclosure relates to computer networks and, more particularly, to virtual private networks.

BACKGROUND

A computer network is a collection of interconnected computing devices that exchange data and share resources. In a packet-based network, such as the Internet, the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

A private network may include a number of devices, such as computers, owned or administered by a single enterprise. These devices may be grouped into a number of site networks, which in turn may be geographically distributed over a wide area. Each site network may include one or more local area networks (LANs). Virtual private networks (VPNs) are often used to securely share data between site networks over a public network, such as the Internet. As one example, VPNs encapsulate and transport layer three (L3) communications, such as Internet Protocol (IP) packets, between the remote sites via the public network.

In one VPN implementation, two or more different VPN gateways may be utilized to form a group VPN. A group VPN does not require point-to-point tunnels to be created between each member VPN gateway as in a traditional Internet Protocol Security (IPsec) VPN deployment. Instead, a key server distributes keys and policies to the member VPN gateways. The VPN packets are encrypted and decrypted by the member VPN gateways using the distributed keys. The shared keys enable each member VPN gateway to decrypt any packets encrypted by any of the other member VPN gateways.

However, like other VPN solutions, detecting and dropping replayed group VPN packets (i.e., anti-replay security) may improve the security of the group VPN. Without any anti-replay solution, checking the integrity of the packet alone may not provide protection against certain kinds of attacks. For example, a packet resulting in the transfer of certain amount of money from one account to another account may be replayed multiple times by an active attacker. Even if the packet is encrypted and authenticated, the receiving device needs to detect and drop the subsequent replays of the original packet. In the traditional point-to-point IPsec VPN tunnel, the anti-replay protection is achieved by means of a sequence number and maintaining a window of these sequence numbers on the receiver. A given packet with a given sequence number will be accepted only once and any subsequent packets with the same sequence number will be dropped.

Traditional point-to-point IPsec VPN tunnel anti-replay mechanisms may not work properly in group VPN deployments as each member of the group VPN may send different packets having different sequence numbers and the sequence numbers are not synchronized across all of the members of the group VPN. One conventional solution to the replay packet problem in a group VPN deployment is to implement time windows. In this solution, the key server and the VPN gateways that are members of the group VPN are synchronized using a pseudo time. The sending members stamp the VPN packet with the current pseudo time. Each receiving member maintains a configurable sized time window. If the incoming packet falls inside this time window, the packet is accepted. However, this solution can only provide loose anti-replay protection, as multiple packets with the same time stamp may be accepted if they fall under the same window. By closely monitoring the traffic patterns, an active attacker can replay a given significant packet multiple times within the time window and can amplify the action associated with that packet.

SUMMARY

In general, this disclosure describes techniques for providing an anti-replay mechanism for group VPN deployments. As described, each receiving VPN gateway of the group VPN may utilize a per-sender sequence number window. By utilizing a per-sender sequence number window, the receiving VPN gateway may drop a replayed packet that would have otherwise been accepted without requiring synchronization of the sequence numbers across all of the members of the VPN group.

For example, if the receiving VPN gateway receives a packet having a sequence number that is less than the lowest sequence number of the sequence number window, the VPN gateway may drop the packet. If the receiving VPN gateway receives a packet having a sequence number that is greater than the highest sequence number of the sequence number window, the VPN gateway may shift up the entire sequence number window so that it includes the newly received sequence number and accept the packet. That is, upon receiving a packet having a sequence number to the right of the sequence number window, the lower and upper bounds of the sequence number window are shifted up by the same amount so as to maintain a fixed number of sequence numbers included within the sequence number window. If the receiving VPN gateway receives a packet having a sequence number that is within the sequence number window, the VPN gateway determines whether a packet having the same sequence number was already received by the VPN gateway. If the sequence number was already seen by the VPN gateway, the VPN gateway drops the packet. However, if the sequence number is a new sequence number that was not previously received by the VPN gateway, then the receiving VPN gateway accepts the packet and marks the sequence number as seen. In this manner, techniques of this disclosure may provide a strict anti-replay mechanism for group VPN deployments and may prevent an active attacker from replaying significant packets.

In one embodiment, a method includes receiving, with a first virtual private network (VPN) device from a second VPN device, a packet having an encryption header, wherein the first and second VPN devices are members of a group VPN having a plurality of VPN devices, wherein the encryption header includes a group VPN member identifier and a sequence number, and wherein the group VPN member identifier is associated with the second VPN device. The method also includes identifying a window of sequence numbers maintained by the first VPN device for the second VPN device based on the group VPN member identifier, wherein the window of sequence numbers defines a range of sequence numbers. The method also includes determining whether the sequence number of the header is included in the window of sequence numbers, and processing the packet, with the first VPN device, based on the determination.

In another embodiment, a first VPN device includes one or more processors, one or more network interfaces configured to receive a packet having an encryption header from a second VPN device, wherein the first and second VPN devices are members of a group VPN having a plurality of VPN devices, wherein the encryption header includes a group VPN member identifier and a sequence number, and wherein the group VPN member identifier is associated with the second VPN device, a data repository configured to store a window of sequence numbers maintained by the first VPN device for the second VPN device, and a VPN session management module. The VPN session management module is operable by the one or more processors to identify the window of sequence numbers based on the group VPN member identifier, wherein the window of sequence numbers defines a range of sequence numbers, determine whether the sequence number of the header is included in the window of sequence numbers, and process the packet based on the determination.

In another embodiment, computer-readable storage medium encoded with instructions that, when executed, cause one or more programmable processors of a first virtual private network (VPN) device to receive a packet having an encryption header from a second VPN device, wherein the first and second VPN devices are members of a group VPN having a plurality of VPN devices, wherein the encryption header includes a group VPN member identifier and a sequence number, and wherein the group VPN member identifier is associated with the second VPN device. The instructions may further cause the one or more programmable processor of the first VPN device to identify a window of sequence numbers maintained by the first VPN device for the second VPN device based on the group VPN member identifier, wherein the window of sequence numbers defines a range of sequence numbers, determine whether the sequence number of the header is included in the window of sequence numbers, and process the packet based on the determination.

The details of one or more embodiments are set forth in the accompanying drawings and the description below. Other features, objects, and advantages will be apparent from the description and drawings, and from the claims.

DETAILED DESCRIPTION

Figure 1:
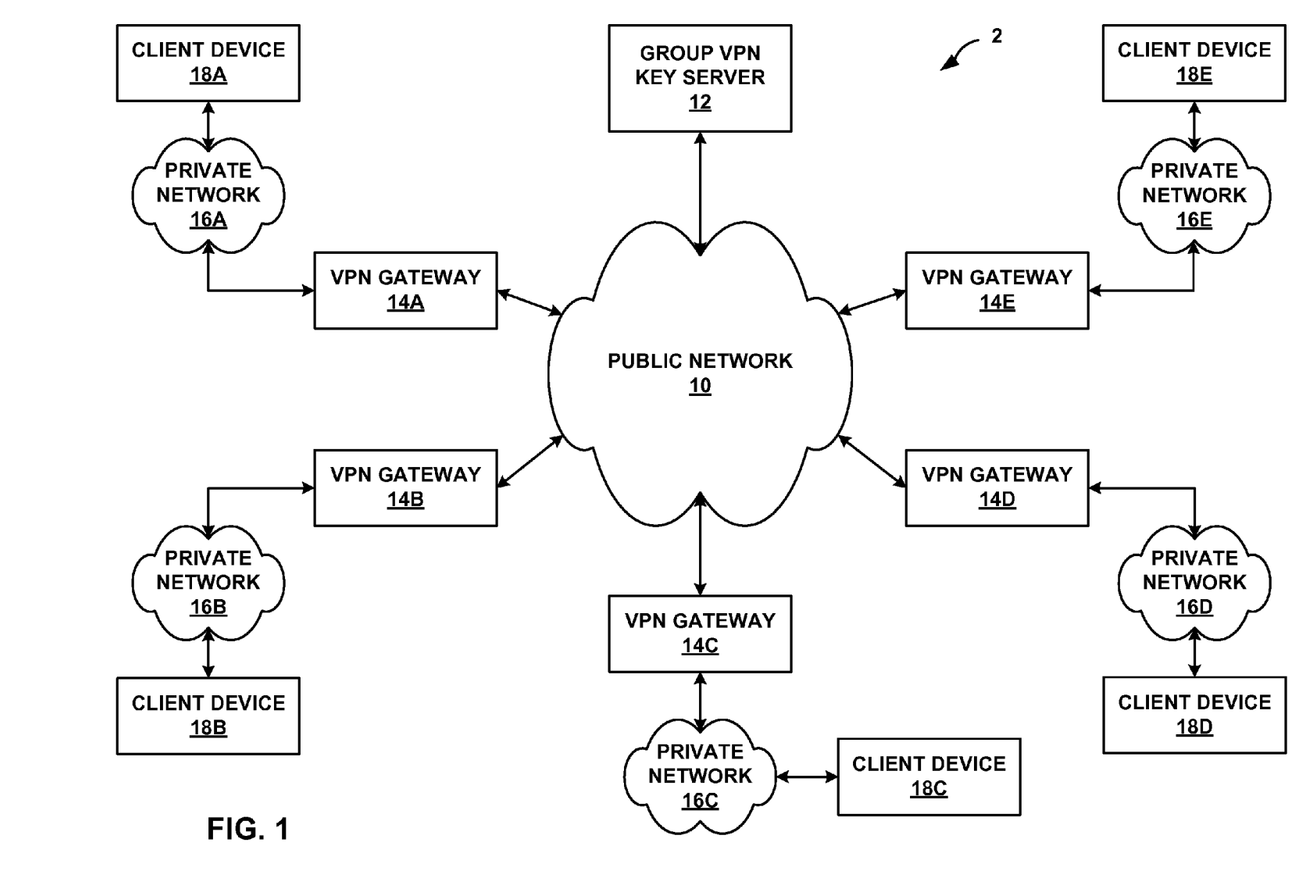
FIG. 1 is a block diagram illustrating an example system in which a client device uses a group virtual private network (VPN) to communicate with other devices.

FIG. 1 is a block diagram illustrating an example system 2 in which client devices use a group virtual private network (VPN) to communicate with other devices. In this example, VPN gateways 14A-14E (collectively, "VPN gateways 14") are members of a group VPN and group VPN key server 12 distributes the keys and policies of the group VPN to VPN gateways 14. VPN gateways 14 are positioned between respective client devices 18A-18E (collectively, "client devices 18") and public network 10 and provide secure and controlled access via network 10 to other client devices 18 and other devices located within private networks 16A-16E (collectively, "private networks 16"). Client devices 18 may represent endpoint devices, such as a mobile device (e.g., a laptop computer, tablet computer, or cellular phone), a personal computer, a computing terminal, an Internet-capable television or device for providing Internet-based television services, or other such devices. VPN gateways 14 are communicatively coupled using public network 10. Even though five VPN gateways 14 are illustrated in FIG. 1, any number of VPN gateways 14 may be included in system 2. Similarly, any number of client devices 18 may be included in each of private networks 16 and any number of private networks 16 may be included in system 2.

Public network 10 and private networks 16 enable transmission of content between network devices using one or more packet-based protocols, such as a Transmission Control Protocol/Internet Protocol (TCP/IP). In this respect public network 10 and private networks 16 may support the transmission of data via discrete data units, often referred to as "packets." As a result, public network 10 and private networks 16 may be referred to as a "packet-based" or "packet switched" network. While described in this disclosure as transmitting, conveying, or otherwise supporting packets, public network 10 and private networks 16 may transmit data according to any other discrete data unit defined by any other protocol, such as a cell defined by the Asynchronous Transfer Mode (ATM) protocol, or a datagram defined by the User Datagram Protocol (UDP).

As illustrated in FIG. 1, client devices 18 send and receive packets from other client devices 18 using a group VPN. The group VPN is maintained by group VPN key server 12 and includes VPN gateways 14. In various instances, the group VPN may include all of VPN gateways 14 or a subset of VPN gateways 14. Group VPN key server 12 distributes one or more shared cryptographic keys and policy information to all member VPN gateways of the group VPN (e.g., VPN gateways 14). In general, the policy information includes policies that specify what data traffic needs to be encrypted or decrypted and what cryptographic keys to use in order to perform the encryption and decryption of the data traffic. One example protocol that may be used for the encryption and decryption of the data traffic in a group VPN is the IPsec protocol. Further details regarding IPsec can be found in Kent et al., RFC 2401, "Security Architecture for the Internet Protocol", November 1998, the entire contents of which is incorporated herein by reference.

Each of VPN gateways 14 have a unique security association with group VPN key server 12 and also share a single security association across all of the VPN gateways 14 that are members of the group VPN. Sharing the single security association (i.e., the group security association) enables each of VPN gateways 14 to decrypt traffic that was encrypted by any of the other member VPN gateways 14. The unique security association for the respective VPN gateway 14 enables each VPN gateway 14 to authenticate against group VPN key server 12 and receive the policy information distributed by group VPN key server 12. The policy information may include encryption policies (e.g., encryption protocols and rekey timers) and cryptographic keys.

When each of VPN gateways 14 authenticates or registers with group VPN key server 12, group VPN key server 12 assigned a unique identifier to the respective VPN gateway 14 (e.g., VPN gateway 14A). The unique identifier is utilized by VPN gateway 14A when VPN gateway 14A encrypts and sends packets to other VPN gateways 14. The encrypted packets typically include an encryption header, which includes a sequence number, and an encrypted payload. One example of an encryption header is an encapsulating security payload (ESP) header as described by Kent et al, RFC 2406, "IP Encapsulating Security Payload (ESP)", November 1998, the entire content of which is incorporated herein by reference. In another example, the encryption header is an ESP header that has been modified so as to include a sequence number that is split into two parts. One part of the sequence number is used to record the unique identifier of the sending VPN gateway 14. The unique identifier uniquely identifies the sending VPN gateway 14 within the group VPN. Between different group VPNs, the same identifier may be used to identify different sending VPN gateways. Another part of the sequence number is used to record an incrementing counter value within the group VPN. That is, when the sending VPN gateway 14 (e.g., VPN gateway 14A) encrypts a packet, VPN gateway 14A generates a sequence number that includes a first portion having a value that uniquely identifies VPN gateway 14A within the group VPN and a second portion having an incrementing counter value.

The first portion of the sequence number of the ESP header for each encrypted packet for which VPN gateway 14A acts as a sender VPN gateway (e.g., encrypts and sends the packet through public network 10) includes the same unique identifier associated with VPN gateway 14A. Similarly, other VPN gateways 14 that act as sender VPN gateways include the unique identifiers associated with each other respective VPN gateway 14 within the first portion of the sequence number of the ESP header of the encrypted packets that the respective VPN gateway 14 is sending over public network 10. While described as a first portion and a second portion, the order of the two portions within the sequence number part of the ESP header may also be configured such that the first portion is the incrementing counter value and the second portion includes the unique identifier of the sender VPN gateway 14.

Utilizing the modified sequence number of the ESP header, each VPN gateway 14 maintains a sequence number window for each unique sender (e.g., for each of the of VPN gateways 14 in the group VPN). Responsive to receiving an encrypted packet from one of the VPN gateways 14 in the group VPN, the receiving VPN gateway 14 (e.g., VPN gateway 14E) extracts an identifier of the sending VPN gateway (e.g., VPN gateway 14A) and the sequence number from the sequence number portion of the ESP header of the received encrypted packet. VPN gateway 14E retrieves a window of counter values maintained by VPN gateway 14E for VPN gateway 14A. In some examples, each of VPN gateways 14 maintains a respective window of incrementing sequence numbers for each of the other VPN gateways 14 included in the group VPN.

VPN gateway 14E applies the window of sequence numbers maintained for VPN gateway 14A to the sequence number of the packet and processes the packet based on where the extracted sequence number falls relative to the window of sequence numbers. For example, if the sequence number is to the left of the window (e.g., the sequence number included in the received packet is less than the lowest sequence number of the window), VPN gateway 14E drops the packet. If the counter value is to the right of the window (e.g., the counter value included in the received packet is greater than the highest counter value of the window), VPN gateway 14E shifts the entire sequence window to the right and accepts the packet. In other words, upon receiving a packet having a sequence number to the right of the sequence number window, the lower and upper bounds of the sequence number window are shifted up (i.e., to higher values) such that, in various instances, a fixed number of sequence numbers included within the sequence number window is maintained. If the counter value is within the window (e.g., the counter value included in the packet is greater than or equal to the lowest sequence number of the window and less than or equal to the highest sequence number of the window), VPN gateway 14E determines if a packet having the same counter value has already been received by VPN gateway 14E (e.g., by accessing a record of received sequence numbers). If a packet having the same counter value has already been received, VPN gateway 14E drops the packet. If a packet having the same counter value has not already been received, VPN gateway 14E accepts the packet and marks the sequence number as being seen. When marking the sequence number as being seen, VPN gateway 14E stores an indication of the sequence number and the associated member identifier of VPN gateway 14A (i.e., the sending VPN gateway) in a data repository of VPN gateway 14E, such as in a historical record of received sequence numbers. In some examples, a separate historical record of received sequence number may be maintained for each sending VPN gateway.

In various instances, a maximum sequence number may be reached. The maximum sequence number may be determined based on the number of bits of the sequence number field of the ESP header that are used to store the sequence number. For example, if five bits are used to store the member identifier, twenty-seven bits may be used to store the sequence number. When the maximum sequence number is reached, a VPN gateway 14 may send a rekey request to the group VPN key server 12. Group VPN key server 12, responsive to the rekey request, sends a rekey command to each of VPN gateways 14 included in the group VPN. The rekey command causes each of the member VPN gateways 14 to reset the sequence number windows (for processing incoming packets), and sequence number counters (for generating outgoing encrypted packets) to an initial range of values or an initial value, respectively, as well as clear the record of received sequence numbers or initiate a new record of received sequence numbers. The rekey command may also include security policies for the group VPN as well as information about each of the other member VPN gateways 14.

When a VPN gateway first becomes a member of the group VPN (e.g., VPN gateway 14C joins the group VPN), group key server 12 sends a message (e.g., a rekey command) to each of the member group VPNs 14 that includes information about the newly joined member VPN gateway 14C, including a member identifier. Responsive to the message, the existing member VPN gateways 14 initialize a sequence number window for the new member VPN gateway 14C. In some examples, the existing member VPN gateways 14 also store new encryption keys specified by the message and re-initialize the sequence number windows and sequence number counter maintained by each respective member VPN gateway 14. VPN gateway 14C receives information about each of the other member VPN gateways 14, including a member identifier for each member VPN gateway 14, and initializes a sequence number window for each member VPN gateway 14 and associates a member identifier with each sequence number window.

In this manner, strict anti-replaying techniques may be implemented in a group VPN. For example, by maintaining a per-sender window of counter values, a receiving VPN may identify and drop replayed packets even if the packets are replayed within a very small amount of time after the original packet was sent. Furthermore, techniques of this disclosure may eliminate the need to maintain a shared packet sequence number, which may reduce the complexity associated with implementing strict anti-replay measures in a group VPN.

Figure 2:
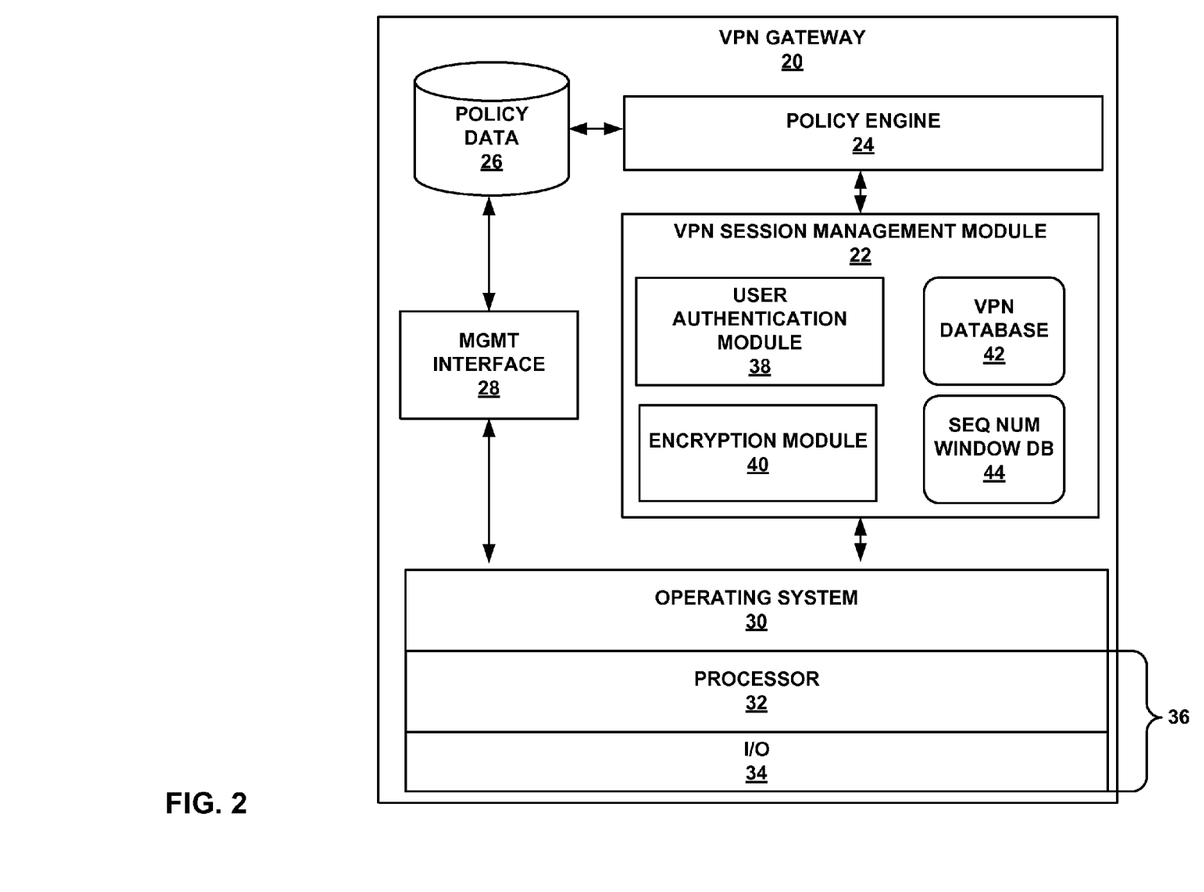
FIG. 2 is a block diagram illustrating an example VPN gateway that operates in accordance with one or more aspects of the present disclosure.

FIG. 2 is a block diagram illustrating an exemplary VPN gateway 20 that operates in accordance with one or more aspects of the present disclosure. VPN gateway 20 is an example embodiment of VPN gateways 14 of FIG. 1. VPN gateway 20 provides secure data connections to an enterprise network (e.g., one of private networks 16 of FIG. 1) using one or more security schemes, such as Secure Sockets Layer (SSL) or Transport Layer Security (TLS). In this example, VPN gateway 20 includes hardware 35 that provides core functionality for operation of the device.

Hardware 35 may include one or more processors 32 configured to operate according to executable instructions (i.e., program code), typically stored in a computer-readable medium such as a static, random-access memory (SRAM) device or a Flash memory device. Input/output (I/O) 34 provides a network interface for sending and receiving network packets to facilitate communication between VPN gateway 20 and other network devices, including other VPN gateways, client devices and protected resources. The network interface may be a wired or wireless interface, such as an Ethernet, fiber optic, token ring, modem, or other network interface. Hardware 35 may include additional discrete digital logic or analog circuitry.

Operating system 30 executes on processor 32 and provides an operating environment for a variety of software modules such as, in this example, VPN session management module 22, management interface 28, and policy engine 24. VPN session management module 22 provides and manages VPN sessions with remote users of a protected network. In the example VPN gateway 20 shown in FIG. 2, VPN session management module 22 includes a user authentication module 36 and a VPN database 40 to track current VPN sessions. User authentication module 36 authenticates remote clients (e.g., client device 18A of FIG. 1) to facilitate access requests by the clients to the group VPN. VPN database 40 is a data structure that stores and maintains VPN session data for various VPN sessions created and administered by VPN session management module 22 as well as information about the group VPN key server and which group to which VPN gateway 20 belongs.

In response to an initial request for access to a protected resource, user authentication module 36 requests and receives credentials from the requesting one of the users. User authentication module 36 validates the credentials to authenticate the user and directs VPN session management module 22 to create a VPN session for the user. VPN session management module 22 creates the VPN session and adds the session to VPN database 40. Thereafter, VPN device 20 and the client device communicate using the VPN session. In some examples, user authentication module 26 authenticates users by communicating with a remote authentication dial in user server (RADIUS) or other authentication, authorization, and accounting (AAA) server.

VPN session management module 22 further includes encryption module 38. Encryption module 38 enables and executes an encryption scheme for securing data connections. Encryption module 38 may implement, for example, SSL, TLS, or another method for securing data connections to form one or more secure data connections between VPN gateway 20 and other network devices. For example, encryption module 38 may encrypt data traveling to other VPN gateways. The structure of an encrypted data packet is described in more detail below with respect to FIG. 3.

Sequence number window database 44 is also included in VPN session management module 22. Sequence number window database 44 is a data structure that stores and maintains a window of sequence numbers for each of the other VPN gateways included in the group VPN. Each sequence number window is associated with a respective VPN gateway using an identifier that is unique within the group VPN. The sequence number windows define a range of sequence numbers (e.g., from a low sequence number through a high sequence number) for each VPN gateway.

Policy engine 24 is a decision engine that defines behaviors of VPN gateway 20 with regard to, for example, rekeying the group VPN and encrypting data. Policy engine 24 accesses policy data 26 in the form of policy rules. In general, a policy rule specifies an action that policy engine 24 is to take upon occurrence of some condition monitored by VPN gateway 20. Policy rules may be expressed as conditional statements, for example, with respect to source or destination network addresses included in data received by VPN gateway 20 or with respect to sequence numbers included in the received data. Policy engine 24 monitors the data and, upon determining satisfaction of the rules set forth in the policies, dynamically encrypts, decrypts, or performs other actions.

For example, when VPN gateway 20 receives a packet from a client device (e.g., client device 18A of FIG. 1), the packet is received using I/O 34. The packet is analyzed and then processed based on the policies stored in policy data 26. In one example, the packet includes a destination address that corresponds to another device that is protected by the group VPN (e.g., client device 18B of FIG. 1). Policy engine 24, using the policy rules, determines that a packet having a source address of client device 18A and a destination address of client device 18B is to be encrypted prior to forwarding via a VPN session. If this is the first packet VPN gateway 20 has received from client device 18A, user authentication module 36 authentications client device 18A or a user of client device 18A and VPN session management module 22 creates a VPN session and stores the VPN session information in VPN database 40. The VPN session information may include the IP address of client device 18A as well as the IP address of client device 18B.

When encrypting the packet prior to forwarding the packet to client device 18B, encryption module 40 copies the header information of the packet (e.g., the IP header, including the source IP address and the destination IP address of the packet) in order to preserve the header for use with the encrypted packet. Encryption module 40 encrypts the packet as payload data of a new encrypted packet, appends authentication information to the encrypted payload data, and prepends a new header that includes the original IP header copied from the original packet as well as an encapsulating security protocol (ESP) header. The ESP header includes a member identifier and a sequence number. The member identifier uniquely identifies VPN gateway 20 within the group VPN. The sequence number, in various instances, is numerical value maintained by VPN gateway 20 that is incremented for each packet encrypted and forwarded by VPN gateway 20.

VPN gateway 20 forwards the encrypted packet across the group VPN to client device 18B based on the original destination IP address of client device 18B specified in the unencrypted packet received from client device 18A. Maintaining the original IP header may preserve the ability to route encrypted packets using the underlying network routing infrastructure. That is, a VPN tunnel may not need to be established between to VPN gateways. Instead, the encrypted packet may be routed as if it were an unencrypted packet. Further, because header preservation is combined with the group VPN security association, multicast replication may be offloaded to the provider network. That is, because every VPN gateway of the group VPN shares the same security association, the VPN gateway closest to the multicast source need not replicate the packets to all of its peers.

In examples where VPN gateway 20 receives a packet from another VPN gateway of the group VPN, VPN session management module 22 extracts header information from the received packet. Policy engine 24, using the policy rules, determines whether the packet needs to be decrypted prior to forwarding to the source address included in the header information. For example, where the packet was sent from client device 18B and includes a destination address associated with client device 18A, policy engine 24 determines that the packet is to be decrypted prior to forwarding to client device 18A. If the packet is a response to a packet sent from client device 18A to client device 18B, VPN session management module 22 may identify the VPN session information stored in VPN database 42 that is associated with the packet. In either instance, VPN session management module determines that the packet is to be decrypted prior to forwarding to client device 18A.

When the packet is an encrypted packet received using the group VPN, VPN session management module 22 determines whether to process or drop the received packet based on the ESP header information. VPN session management module 22 extracts the sequence number field of the header. In various instances, the sequence number field includes both a member identifier and a sequence number. Continuing the example from above, the member identifier portion of the sequence number field uniquely identifies VPN gateway 14B used by client device 18B to send the packet to VPN gateway 20 using the group VPN. The sequence number portion of the sequence number field includes a value numerical value specified by the encrypting VPN gateway (e.g., VPN gateway 14B).

VPN session management module 22 extracts the member identifier and sequence number from the sequence number field of the header information and performs a lookup in sequence number window database 44 to retrieve information specifying a window of sequence numbers associated with the sending VPN gateway based on the member identifier. The retrieve sequence number window specifies a range of sequence numbers between a low and a high numerical value. VPN session management module 22 determines whether to process the packet or drop the packet based on where the sequence number included in the packet falls relative to the retrieved sequence number window for the sending VPN gateway as well as whether VPN session management module 22 has previously processed a packet received from the sending VPN device and having the included sequence number.

For example, if the sequence number is lower than the lowest value of the sequence number window, VPN session management module 22 may be configured to drop the packet and not forward the packet to the destination device. When the sequence number is lower than the lowest value of the sequence number window, the packet may be a replayed packet and thus an invalid packet. If the sequence number is higher than the highest value of the sequence number, VPN session management module 22 may be configured to shift the sequence number window to include the sequence number. For example, if the sequence number window includes the range of values from seven to twenty and the sequence number of the received packet is twenty-two, the sequence number window may shift to include the values eight to twenty-two, in one example, or the values nine to twenty-two, in another example.

In examples where the sequence number falls within the sequence number window (e.g., the sequence number is the value twenty and the sequence number window includes values from seven to twenty), VPN session management module 22 determines whether a packet having the same sequence number was already received from the VPN gateway identified by the member identifier. VPN session management module 22 may store the received sequence numbers in VPN database 42 and query VPN database 42 for the sequence number of the received packet. If the sequence number was not received in an earlier packet (e.g., the sequence number is not found in VPN database 42), VPN session management module 22 has not previously received a packet having the sequence number and VPN session management module 22 processes the packet. If the sequence number was received in an earlier packet (e.g., the sequence number is found in VPN database 42), VPN session management module 22 determines that the packet is a replayed packet and drops the packet without further processing.

VPN session management module 22 processes a valid packet (e.g., a packet having a sequence number that is higher than or within the sequence number window where VPN session management module 22 has not previously processed a packet having the sequence number), encryption module 40 decrypts the encrypted data payload of the received packet and the decrypted packet is forwarded based on the original IP header included in the decrypted packet. VPN session management module 22 also stores an indication of the sequence number and member identifier of the processed packet (e.g., within VPN database 42). Storing the sequence number may enable VPN session management module 22 to identify replayed packets that may include sequence numbers that fall within the sequence number window.

Figure 3:
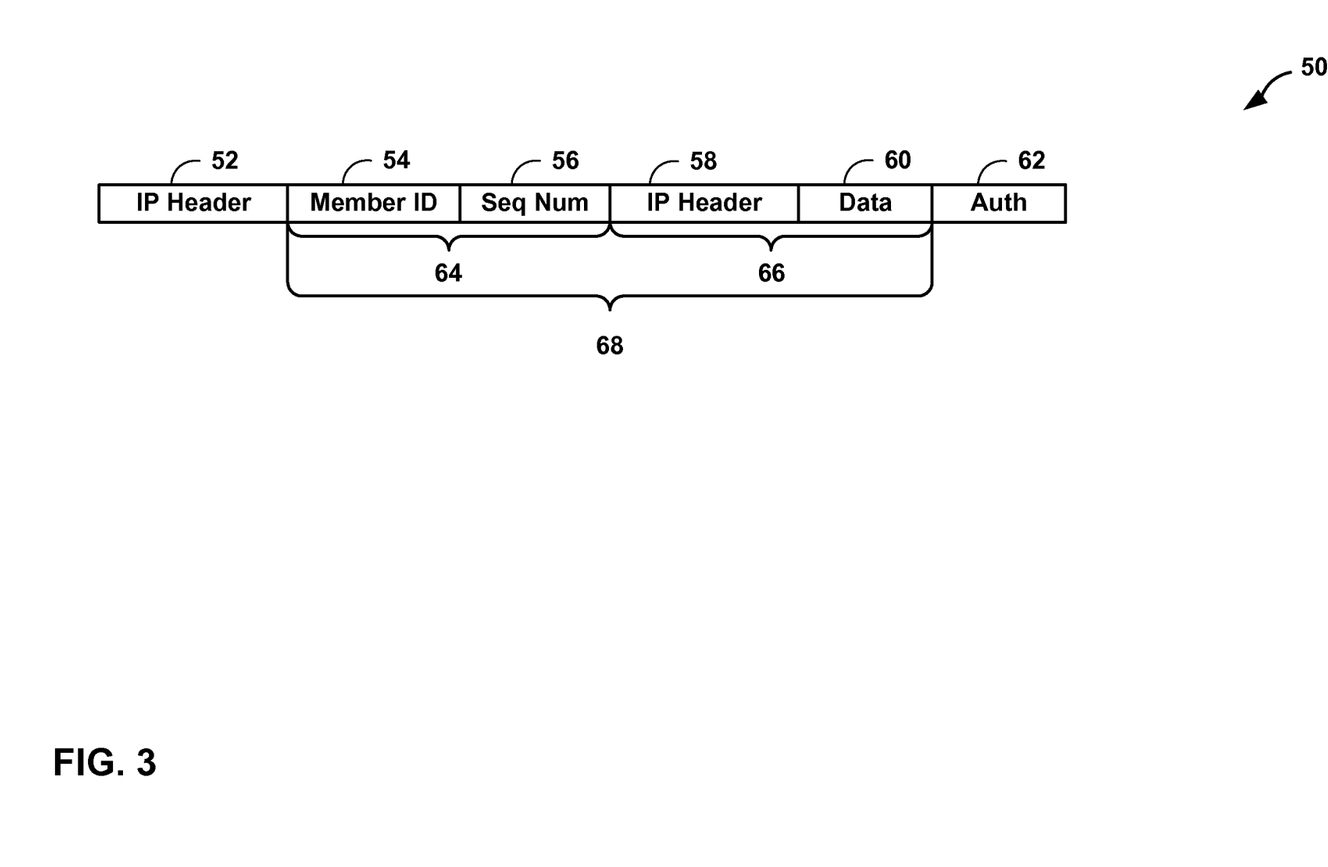
FIG. 3 is a block diagram illustrating an example group VPN message configured in accordance with one or more aspects of the present disclosure.

FIG. 3 is a block diagram illustrating an example group VPN message 50 configured in accordance with one or more aspects of the present disclosure. Group VPN message 50 is one example of an encrypted packet generated by a member VPN gateway (e.g., VPN gateway 20) responsive to receiving an unencrypted packet from a client device. Group VPN message 50 includes IP header 52, authenticated portion 68, and authentication information 62. IP header 52, in various instances, is a copy of the IP header of the received packet. That is, IP header 52 includes the original source IP address and the original destination IP address of the received packet. Authentication information 62 includes an integrity check value that is computer over the packet, not including authentication information 62 (i.e., authenticated portion 68). Authentication information 62 may be used by the receiving VPN gateway to validate the packet encryption.

Authenticated portion 68 includes sequence number field 64 and encrypted portion 66. Sequence number field 64 may be one field of an ESP header included in group VPN message 50. The ESP header may include other fields, such as a security parameters index that, in combination with the destination IP address and security protocol, uniquely identifies the security association for the packet. Encrypted portion 66, in one example, includes the unencrypted packet received from the client device, including IP header 58 and data payload 60. When generating encrypted portion 66, the encryption module (e.g., encryption module 38 of FIG. 2) encrypts the entire contents of the originally received packet. IP header 58 includes the information specified by the IP header included in the received packet and data 60 includes the payload of the received packet. In some examples, IP header 52 includes all of the information of IP header 58 such that group VPN message 50 is routed in the same manner as the received unencrypted packet using the same source and destination address information.

Sequence number field 64 includes member identifier portion 54 and sequence number portion 56. Member identifier portion 54 and sequence number portion 56 may each be any number of bits long. In one example, sequence number field 64 is thirty-two bits long, member identifier portion 54 is five bits long, and sequence number portion 56 is twenty-seven bits long. In this example, member identifier portion 54 supports thirty-two unique member identifiers and sequence number portion 56 support 134,217,728 sequence numbers. In general, sequence number field 64 may be any number of bits in length and member portion identifier portion 54 and sequence number portion 56 may be any combination of number of bits in length that equal the total length of sequence number field 64.

Figure 4:
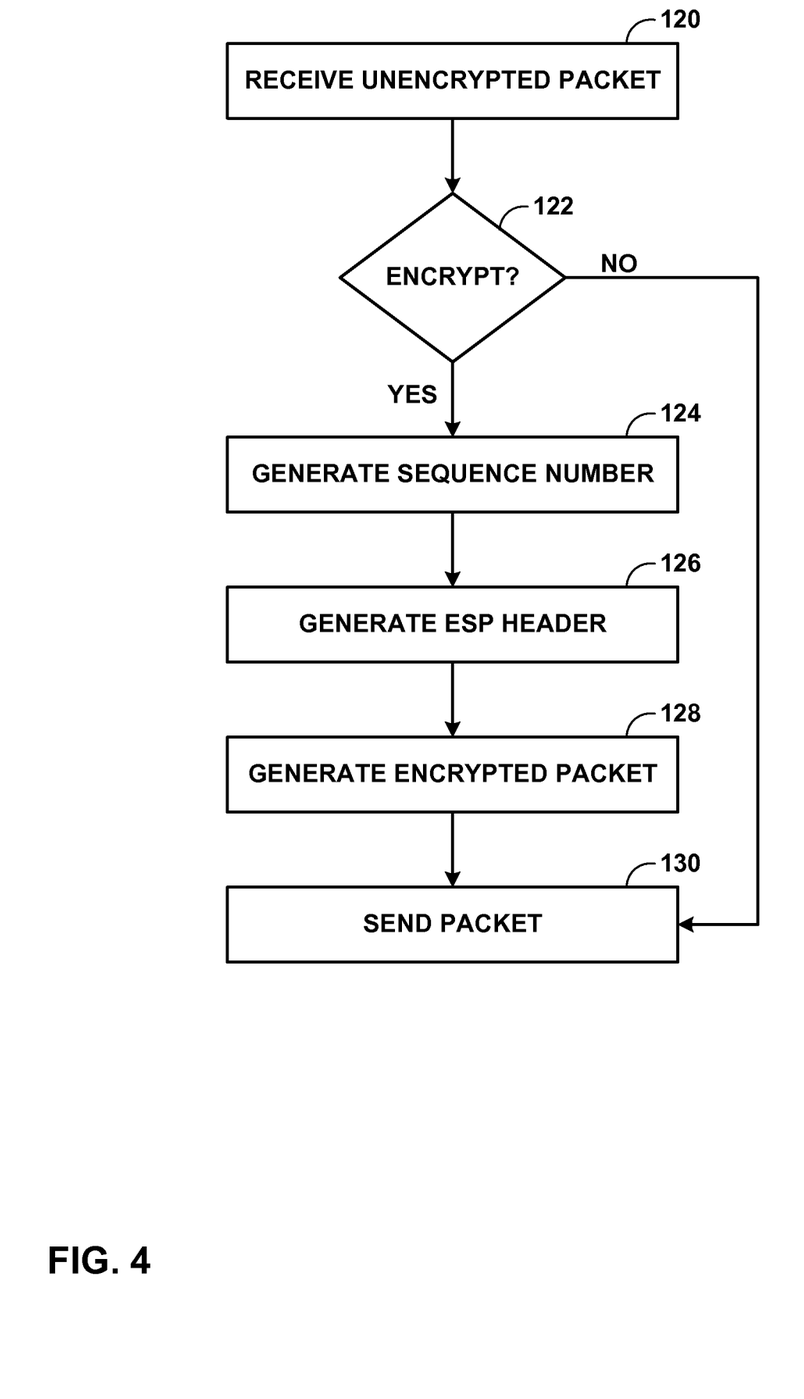
FIG. 4 is a flow chart illustrating an example operation of a VPN gateway generating and sending a group VPN message.

FIG. 4 is a flow chart illustrating an example operation of a VPN gateway generating and sending a group VPN message. For purposes of clarity, the example process shown in FIG. 4 will be described with respect to network system 2 of FIG. 1 and VPN gateway 20 of FIG. 2. However, the example process illustrated in FIG. 4 should not be considered as being limited to the specific functional components illustrated in FIGS. 1 and 2.

VPN gateway 20 receives an unencrypted packet (120) from a client device via a private network (e.g., from client device 18A via private network 16A). Policy engine 24, using policy information stored in policy data 26, determines whether the received packet requires special process, such as encryption, prior to being forwarded (122). In examples where policy engine 24 determines that the received packet does not need to be encrypted ("NO" branch of 122), VPN gateway 20 forwards the packet to the next hop based on the header information included in the packet (130).

In examples where policy engine 24 determines that the received packet is to be encrypted prior to forwarding ("YES" branch of 122), VPN session management module 22 generates a sequence number for the encrypted packet (124). The sequence number may be generated based on a stored value that is incremented each time VPN gateway 20 generates an encrypted packet for the group VPN. In some examples, VPN gateway 20 may be a member of two or more different group VPNs and may maintain a separate sequence number for each of the group VPNs in which VPN gateway 20 is a member. If the packet is a first packet received from the client device having the specified destination address, VPN session management module 22 may create a VPN session and store VPN session information in VPN database 42.

VPN session management module 22 generates the ESP header for the encrypted packet (126). The ESP header includes a sequence number field that, according to techniques of this disclosure, includes a member identifier portion and a sequence number potion. The sequence number portion includes the generated sequence number. The member identifier portion includes a value that uniquely identifies VPN gateway 20 within the group VPN.

Encryption module 38 generates the encrypted packet based on the ESP header and the received packet (128). The encrypted packet includes a copy of the original IP header of the received packet, the ESP header, an encrypted data payload that includes the received packet, and authentication information. The IP header of the encrypted packet includes the source IP address and destination IP address specified in the received packet. VPN gateway 20 then sends the packet using I/O 34 to the next hop corresponding to the destination IP address included in the IP header (130).

Figure 5:
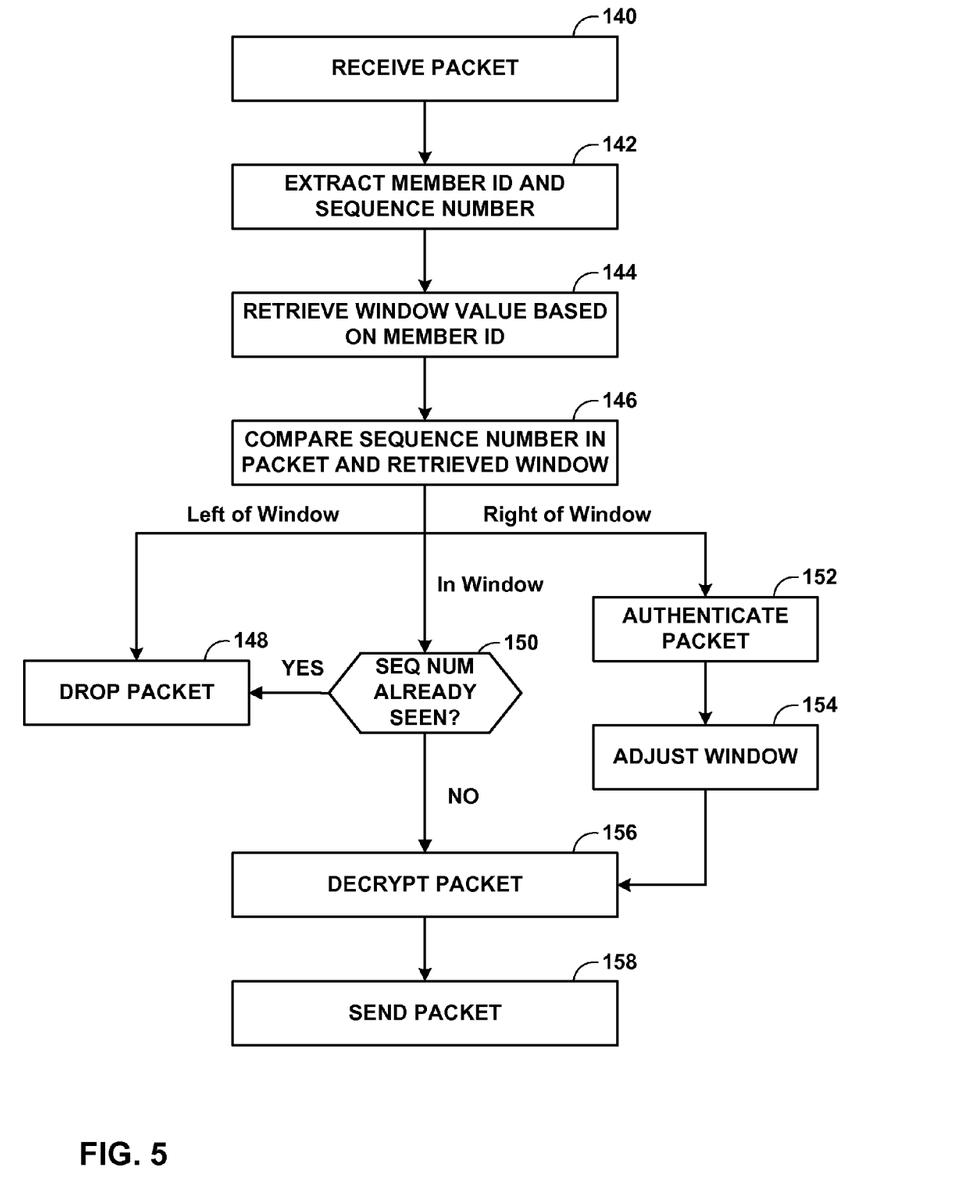
FIG. 5 is a flow chart illustrating an example operation of a VPN gateway validating a received group VPN message in accordance with one or more aspects of the present disclosure.

FIG. 5 is a flow chart illustrating an example operation of a VPN gateway validating a received group VPN message in accordance with one or more aspects of the present disclosure. For purposes of clarity, the example process shown in FIG. 4 will be described with respect to network system 2 of FIG. 1 and VPN gateway 20 of FIG. 2. However, the example process illustrated in FIG. 4 should not be considered as being limited to the specific functional components illustrated in FIGS. 1 and 2.

VPN gateway 20 is a member of a group VPN and receives a group VPN message (e.g., an encrypted packet) from a different member VPN device of the group VPN (140). The received packet includes an IP header, an ESP header, an encrypted payload, and authentication information. VPN session management module 22 may retrieve stored VPN session information associated with the source IP address of the encrypted packet. Alternatively or in addition, policy engine 24 may determine whether the encrypted packet requires additional processing based on the policy rules stored in policy data 24.

When the encrypted packet is associated with an existing VPN session and/or policy engine 24 determines that the encrypted packet requires processing by VPN session management module 22, VPN session management module 22 extracts the member identifier and sequence number from the encrypted packet (142). The member identifier and sequence number are included in the sequence number field of the ESP header of the encrypted packet. That is, the sequence number field is overloaded to include a sequence number as well as a member identifier. The member identifier uniquely identifies the member VPN device that encrypted the packet (e.g., VPN gateway 14E).

VPN session management module 22 retrieves a stored sequence number window from sequence number window database 44 based on the member identifier extracted from the sequence number field of the encrypted packet (144). If no sequence number window is retrieved, VPN session management module 22 may drop the packet as an invalid packet. If a sequence number window is retrieved from sequence number window database 44, VPN session management module 22 compares the sequence number to the retrieved sequence number window (146).

If the sequence number is to the left of the sequence number window (i.e., the sequence number is less than the lowest value of the sequence number window), VPN session management module 22 determines that the packet is a replayed or otherwise invalid packet and drops the packet (148). If the sequence number is to the right of the sequence number window (i.e., the sequence number is greater than the highest value of the sequence number window), VPN session management module 22 authenticates the packet (152). When authentication a packet, VPN session management module computes the integrity check value (ICV) based on the ESP header minus the authentication data portion of the ESP header and compares the ICV to the value stored in the authentication data portion of the ESP header to verify that the packet was sent from the correct device. If the computing ICV and authentication data match, the packet is authenticated.

For each authenticated packet, VPN session management module 22 determines that the packet is a valid packet and adjusts the sequence number window maintained by VPN session management module 22 for the sending member VPN device (154). When adjusting the sequence number window, VPN session management module 22 may increase the upper limit of the sequence number window to match or exceed the sequence number. In some examples, VPN session management module 22 may also increase the lower limit of the sequence number window by some amount. As examples, VPN session management module 22 may increase the lower limit by one or may increase the lower limit by the amount VPN session management module 22 increased the upper limit (i.e., to maintain the same number of values included in the sequence number window).

If VPN session management module 22 determines that the sequence number is included within the sequence number window, VPN session management module 22 determines whether the packet is a replayed packet based on the whether or not the sequence number was already seen (e.g., received) by VPN session management module 22 (150). If the sequence number is a repeated sequence number (e.g., the sequence number was included in a previously received packet), VPN session management module 22 determines that the packet is a replayed packet ("YES" branch of 150) and drops the packet (148). If the sequence number is not a repeated sequence number ("NO" branch of 150), VPN session management module 22 further processes the packet. In some examples, VPN session management module 22 stores the sequence number in VPN database 42 such that, when another encrypted packet is received, VPN session management module 22 may query VPN database 42 to determine whether the sequence number included in the later received packet was already received in another packet.

When VPN session management module 22 determines that the packet is a valid packet and requires further processing (i.e., the sequence number of the packet is greater than any value in the sequence number window maintained for the sending member VPN device or the sequence number is within the sequence number window and was not previously received), encryption module 24 decrypts the encrypted packet (156). In decrypting the encrypted packet, encryption module 24 extracts the encrypted portion of the packet and validates the encryption using the authentication information included in the packet. If the encryption is validated, encryption module 24 identifies the key to use for the decryption based on the member identifier. That is, encryption module 24 maintains an association between one or more decryption keys and member identifiers of the group VPN. After decryption the packet, VPN gateway 20 sends the decrypted packet to the next hop associated with the destination IP address using I/O 34 (158).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

Various embodiments have been described. These and other embodiments are within the scope of the following claims.

What is claimed is:

1. A method comprising:
receiving, with a first virtual private network (VPN) device from a second VPN device, a packet having an encryption header, wherein the first and the second VPN devices are members of a group VPN having a plurality of VPN devices, wherein the encryption header comprises an encapsulating security payload header having a sequence number field, wherein the sequence number field comprises thirty-two sequential bits and only includes a first portion that specifies a group VPN member identifier and a second portion that specifies a sequence number, wherein the first portion of the sequence number field comprises a first five bits of the sequence number field and immediately precedes the second portion of the sequence number field, wherein the second portion of the sequence number field comprises twenty-seven bits immediately following the first five bits of the sequence number field, and wherein the group VPN member identifier is associated with the second VPN device;
identifying a window of sequence numbers maintained by the first VPN device for the second VPN device based on the group VPN member identifier, wherein the window of sequence numbers defines a range of sequence numbers;
determining whether the specified sequence number of the header is included in the window of sequence numbers; and
responsive to determining that the specified sequence number of the header is included in the window of sequence numbers:
determining, with the first VPN device, whether the specified sequence number was previously received by the first VPN device;
when the specified sequence number was not previously received, accepting the packet and marking the specified sequence number as received; and
when the specified sequence number was previously received, dropping the packet.

2. The method of claim 1, further comprising:
receiving, with the first VPN device from a VPN key server of the group VPN, a message, wherein the message includes a unique group VPN member identifier that identifies each VPN device of the plurality of VPN devices as members of the group VPN; and
initiating a different sequence number window for each member of the group VPN, wherein each of the different sequence number windows is associated with the respective member VPN device by at least the unique group VPN member identifier of the respective member VPN device.

3. The method of claim 1, further comprising:
receiving, from a VPN key server of the group VPN, a rekey message; and
resetting the sequence number window to an initial value based on the rekey message.

4. The method of claim 1, further comprising:
determining that a highest value of the sequence number window has reached a maximum value; and
sending, to a VPN key server of the group VPN, a rekey request.

5. The method of claim 1, further comprising:
maintaining a plurality of sequence number windows, wherein each sequence number window of the plurality of sequence number windows is associated with one of the plurality of VPN devices.

6. The method of claim 1, further comprising: when the specified sequence number is determined to be lower than the window of sequence numbers, dropping the packet.

7. The method of claim 1, further comprising:
when the specified sequence number is determined to be higher than the window of sequence numbers, adjusting the window of sequence numbers to include the specified sequence number of the packet header.

8. The method of claim 7, wherein adjusting the window of sequence numbers comprises:
calculating an amount of difference between a highest sequence number of the window of sequence numbers and the specified sequence number of the header;
increasing a lowest sequence number of the window of sequence number by the calculated amount of difference; and
setting the highest sequence number of the window of sequence numbers to be equal to the specified sequence number of the header.

9. A first virtual private network (VPN) device comprising:
one or more processors;
one or more network interfaces configured to receive a packet having an encryption header from a second VPN device, wherein the first and the second VPN devices are members of a group VPN having a plurality of VPN devices, wherein the encryption header comprises an encapsulating security payload header having a sequence number field, wherein the sequence number field comprises thirty-two sequential bits and only includes a first portion that specifies a group VPN member identifier and a second portion that specifies a sequence number, wherein the first portion of the sequence number field comprises a first five bits of the sequence number field and immediately precedes the second portion of the sequence number field, wherein the second portion of the sequence number field comprises twenty-seven bits immediately following the first five bits of the sequence number field, and wherein the group VPN member identifier is associated with the second VPN device; and
a memory configured to store a data repository and a VPN session management module,
wherein the data repository is configured to store a window of sequence numbers maintained by the first VPN device for the second VPN device, and
wherein the VPN session management module is operable by the one or more processors to identify the window of sequence numbers based on the group VPN member identifier, wherein the window of sequence numbers defines a range of sequence numbers, determine whether the specified sequence number of the header is included in the window of sequence numbers, and, responsive to determining that the specified sequence number of the header is included in the window of sequence numbers: determine whether the specified sequence number was previously received by the first VPN device, when the specified sequence number was not previously received, accepting the packet and marking the specified sequence number as received, and when the specified sequence number was previously received, drop the packet.

10. The first VPN device of claim 9,
wherein the one or more network interfaces is configured to receive, from a VPN key server of the group VPN, a message, wherein the message includes a unique group VPN member identifier that identifies each VPN device of the plurality of VPN devices as members of the group VPN, and
wherein the VPN session management module is operable by the one or more processors to store, in the data repository, a different sequence number window for each member of the group VPN, wherein each of the different sequence number windows is associated with the respective member VPN device by at least the unique group VPN member identifier of the respective member VPN device.

11. The first VPN device of claim 9,
wherein the one or more network interfaces is configured to receive, from a VPN key server of the group VPN, a rekey message, and
wherein the VPN session management module is operable by the one or more processors to reset the sequence number window to an initial value based on the rekey message.

12. The first VPN device of claim 9,
wherein the VPN session management module is operable by the one or more processors to determine that a highest value of the sequence number window has reached a maximum value, and
wherein the one or more network interfaces is configured to send, to a VPN key server of the group VPN, a rekey request.

13. The first VPN device of claim 9, wherein the VPN session management module is operable by the one or more processors to maintain a plurality of sequence number windows stored in the data repository, wherein each sequence number window of the plurality of sequence number windows is associated with one of the plurality of VPN devices.

14. The first VPN device of claim 9, wherein the VPN session management module is operable by the one or more processors to drop the packet when the specified sequence number is determined to be lower than the window of sequence numbers.

15. The first VPN device of claim 9, wherein the VPN session management module is operable by the one or more processors to adjust the window of sequence numbers to include the specified sequence number of the packet header when the specified sequence number is determined to be higher than the window of sequence numbers.

16. The first VPN device of claim 15, wherein the VPN session management module is operable by the one or more processors to calculate an amount of difference between a highest sequence number of the window of sequence numbers and the sequence number of the header, adjust the window of sequence numbers by at least being operable to increase a lowest sequence number of the window of sequence number by the calculated amount of difference, and set the highest sequence number of the window of sequence numbers to be equal to the sequence number of the header.

17. A computer-readable storage medium encoded with instructions that, when executed, cause one or more programmable processors of a first virtual private network (VPN) device to:

receive a packet having an encryption header from a second VPN device, wherein the first and the second VPN devices are members of a group VPN having a plurality of VPN devices, wherein the encryption header comprises an security payload header having a sequence number field, wherein the sequence number field comprises thirty-two sequential bits and only includes a first portion that specifies a group VPN member identifier and a second portion that specifies a sequence number, wherein the first portion of the sequence number field comprises a first five bits of the sequence number field and immediately precedes the second portion of the sequence number field, wherein the second portion of the sequence number field comprises twenty-seven bits immediately following the first five bits of the sequence number field, and wherein the group VPN member identifier is associated with the second VPN device;

identify a window of sequence numbers maintained by the first VPN device for the second VPN device based on the group VPN member identifier, wherein the window of sequence numbers defines a range of sequence numbers;

determine whether the specified sequence number of the header is included in the window of sequence numbers; and responsive to determining that the specified sequence number of the header is included in the window of sequence numbers:

determine whether the specified sequence number was previously received by the first VPN device;

when the specified sequence number was not previously received, accept the packet and marking the specified sequence number as received; and when the specified sequence number was previously received, drop the packet.

* * * * *